(No Model.)

A. T. LINDERMAN.
METHOD OF PREPARING LUMBER TRIMMINGS FOR BOXES, &c.

No. 517,348. Patented Mar. 27, 1894.

Witnesses:
Lew. E. Curtis.
H. W. Munday.

Inventor:
Albert T. Linderman
By Munday Evarts & Adcock
His Attorneys.

UNITED STATES PATENT OFFICE.

ALBERT T. LINDERMAN, OF WHITEHALL, MICHIGAN.

METHOD OF PREPARING LUMBER-TRIMMINGS FOR BOXES, &c.

SPECIFICATION forming part of Letters Patent No. 517,248, dated March 27, 1894.

Application filed March 14, 1889. Serial No. 303,327. (No model.)

*To all whom it may concern:*

Be it known that I, ALBERT T. LINDERMAN, a citizen of the United States, residing in Whitehall, in the county of Muskegon and State of Michigan, have invented a new and useful Improvement in Methods of Preparing Lumber-Trimmings for Boxes, &c., of which the following is a specification.

This invention relates to an improved method of preparing lumber stock suitable for making up into boxes and other articles, from the "trimmings," so called, of lumber mills, and from other small and narrow stuff, the main object of the invention being the utilization of the waste products of the lumber mills.

Figure 1:
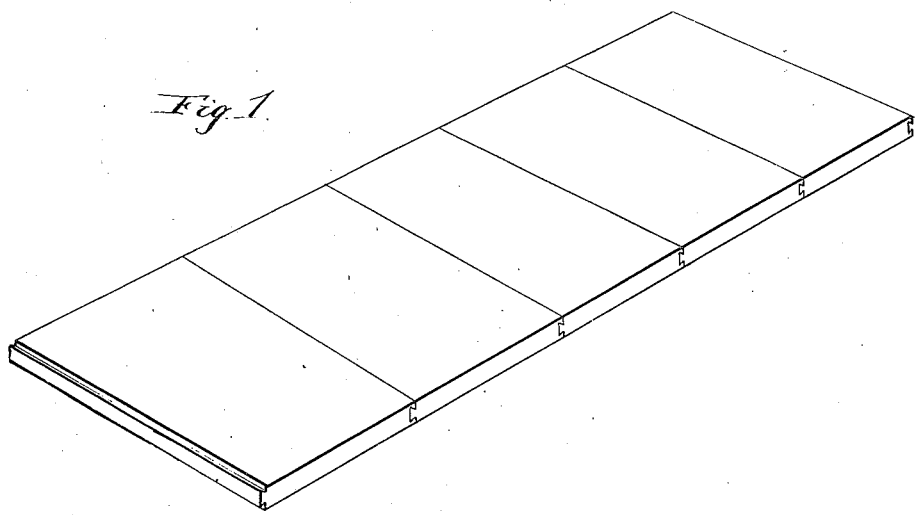
Figure 2:
Figure 3:
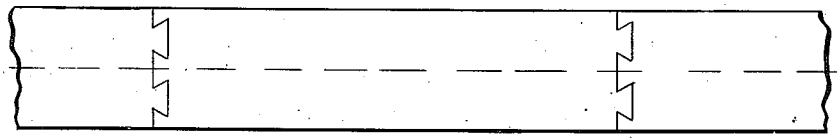
Figure 4:
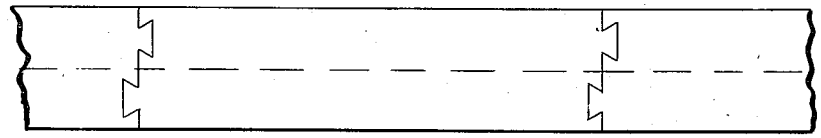

In the accompanying drawings I have shown at Figure 1 a perspective of one of the composite sheets or board formed in accordance with my invention from the trimmings. Fig. 2 is a partial edge view of the same, enlarged. Fig. 3 is a view similar to Fig. 2 of a composite board provided with double dove-tails at the joints, and adapted to be re-sawed upon the plane of the broken or dotted line and thus form two boards, like that shown at Fig. 1. Fig. 4 is a view similar to Fig. 3, showing a groove and tongue upon the same edge of the trimmings instead of two grooves or two tongues, as in Fig. 3.

In carrying out my invention I take these trimmings, or other waste lumber, and edge them if they need that operation, and then saw them into the various lengths required in making the boxes or other articles, each piece of the stuff being freed from its imperfections, and the length to which it is reduced being generally the length of the longest stock required in the box or other article which it is capable of producing. I next assort these lengths into piles according to their length and width, putting by themselves all pieces which agree with each other in these two particulars. The thickness must also be regarded, but as a "run" of the trimmings will generally be of uniform thickness, that feature is one which need not be here dwelt upon. I next proceed to build up wide sheets or boards, such as are required by the work in hand, from these narrow assorted trimmings, by joining the long or longitudinal edges of two or more pieces of the latter together in the manner following: Upon said edges I form interfitting dovetail tongues and grooves, running lengthwise of the stuff and with the grain, such tongues and grooves being relatively so sized as to insure an active clamping or compression of the tongues by the grooves when the parts are put together. The edges being thus prepared I take two pieces of the trimmings of the same length and the same width, or different widths according to the width required in the made up board, and position them in alignment with each other as nearly as may be; that is, in parallel position with the dovetail tongue upon the edge of one in line with the groove of the edge of the other, and impart a quick and continuous lengthwise movement by power to one of the pieces, driving it toward and upon the other, and thus forcing the tongue into the groove and closing the joint between the pieces. Glue may be applied to the moving part as it moves into engagement with the other. I have found in my practice of the invention that if the tongue and groove do not exactly register when the ends of the pieces first meet, they will quickly spring into register without stopping the movement or injuring either part of the joint, so that the operation may proceed to its close without interruption from this cause. Although this lack of accurate alignment is, and must in the nature of things be the rule rather than the exception in work of this kind, I have never found that it gave trouble. The yielding nature of the wood also allows the joints to be closed when the tongue or groove is not as accurately cut as is desirable. If the two widths thus united are not sufficient to form the width of board required, I unite to one of the edges of the united widths a third piece of assorted trimmings, by a similar, compressing dovetail joint, employing the same quick, sliding power-imparted movement to close the joint; and so on with other widths if they are required. By making the joint in dovetail form, and thus tight, not only are the united or composite boards formed from the narrow trimmings, caused to be firm, rigid and nearly as strong as though formed of one integral piece, but where the joints are glued there is no necessity for clamping them while the glue is setting, as would be required with other tongue and groove joints, because the joints thus formed are self clamping. Nor is there any necessity for giving time for the setting of the glue, as the close or self-clamping dovetail joints possess sufficient strength to hold the parts together, and permit the planing of the composite board, and the other handling and manipulation to which it is subjected subsequently in working it up.

In the case of the thicker stuffs, I prefer to form two interfitting dovetail tongues and grooves at the longitudinal edges as such double dovetails are formed with the same facility and may be joined as quickly and easily as the single dovetails. Moreover, they afford this additional advantage, viz: that the composite boards may be resawed; that is, divided along its central plane from edge to edge and end to end, and between the dovetails of the joints, thus producing from the single sheet or composite board, two thinner sheets or boards having each the same amount of surface as the parent board. This resawing may be done as soon as the parent board is made up, without waiting for the setting of the glue, for reasons already given, and the resawed boards may also be planed and worked up at once. By thus building up the thicker stuffs through the medium of double dovetail longitudinal joints, and then resawing, a considerable saving is effected, as but one dovetail forming and one joint closing operation is requisite, when two of each would otherwise be necessary. Of course the double joints require the same compressing or self-clamping fit between the tongues and grooves as in the case of the single form of joint, and where the stuff is not resawed, the double dovetail joints add greatly to the stiffness of the made up board, being much more efficient in that regard than the single dovetails.

The dovetail tongues and grooves of the double joints may be formed in pairs, two tongues or two grooves on one edge, or one tongue and one groove may be formed on the same edge. Either construction accomplishes the purpose.

It will be noticed that by my invention the composite board, although composed of two or more pieces, may be brought to such length and width as to permit its being put directly into the box, or other article, without further reduction, or trimming; but if the stuff should be too long or too wide, it may, after being made up into wide boards, be cut to the length or width required without ultimate loss either of stuff or labor. It will also be noticed that my invention not only enables me to make good packing boxes from small and otherwise waste stuff, but also enables me to use up all the stock with little or no loss.

I claim to have first discovered that a perfect alignment of the end wood of one piece having a dovetail tongue or groove with the end wood of another piece having an interfitting dovetail tongue or groove is not necessary to the closing of the joint where one piece is driven powerfully against the other, the spring of the lumber upon such portions of the contacting joint as are out of alignment serving to throw the joint into place, and this discovery enables me to make a practical use of long dovetail joints, as it demonstrates that such joints can be cheaply and rapidly driven together by powerful machinery.

I claim—

1. The herein described process of forming wide boards from narrow pieces for use in boxes, &c., consisting in forming two dovetail tongues, or a single dovetail tongue and a dovetail groove lengthwise upon one adjoining edge of the narrow pieces composing the board, and two corresponding dovetail grooves, or a single dovetail groove and a dovetail tongue, lengthwise upon the other adjoining edge of the narrow pieces composing the board, whereby a stiff, composite board is formed by the joining of said dovetail tongues and interfitting grooves, substantially as set forth.

2. The improved method of preparing lumber trimmings and similar stuff, consisting in assorting the trimmings according to their length and width, then forming double, dovetail, interfitting tongues and grooves running with the grain along their side edges, then uniting two or more pieces to form wide sheets or boards by driving such edges together, and finally resawing such sheet or board, substantially as set forth.

3. The improvement in the method of preparing lumber trimmings and similar stuff, consisting in forming double interfitting dovetail tongues and grooves running with the grain along the edges of the stuff, then uniting them by driving such edges together, then resawing the united pieces between the dovetails of the joints, substantially as set forth.

ALBERT T. LINDERMAN.

In presence of—
EDW. S. EVARTS,
H. M. MUNDAY.